(12) United States Patent
Ho et al.

(10) Patent No.: US 12,198,306 B2
(45) Date of Patent: Jan. 14, 2025

(54) CONTENT BASED IMAGE PROCESSING

(71) Applicant: Apple Inc., Cupertino, CA (US)

(72) Inventors: Ching E. Ho, San Jose, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/950,917

(22) Filed: Sep. 22, 2022

(65) Prior Publication Data

US 2023/0020964 A1    Jan. 19, 2023

Related U.S. Application Data

(63) Continuation of application No. 16/846,904, filed on Apr. 13, 2020, now Pat. No. 11,488,285.

(51) Int. Cl.
*G06T 5/73* (2024.01)
*G06T 3/4046* (2024.01)
(Continued)

(52) U.S. Cl.
CPC .............. *G06T 5/70* (2024.01); *G06T 3/4046* (2013.01); *G06T 7/10* (2017.01); *G06T 2207/20084* (2013.01)

(58) Field of Classification Search
CPC ..... G06T 5/00–50; G06T 7/10; G06T 3/4046; G06T 2207/20084
See application file for complete search history.

(56) References Cited

U.S. PATENT DOCUMENTS 5,081,692 A      1/1992   Kwon et al.
6,330,372 B1 *  12/2001   Goldstein ................ G06T 5/20
                                                          382/262
(Continued)

FOREIGN PATENT DOCUMENTS

CN    107924554 A    4/2018
CN    109416829 A    3/2019
(Continued)

OTHER PUBLICATIONS

PCT International Search Report and Written Opinion, PCT Application No. PCT/US2021/023128, Jun. 25, 2021, 13 pages.
(Continued)

*Primary Examiner* — Sean T Motsinger
(74) *Attorney, Agent, or Firm* — Sterne, Kessler, Goldstein & Fox P.L.L.C.

(57) ABSTRACT

Some embodiments relate to sharpening segments of an image differently based on content in the image. Content based sharpening is performed by a content image processing circuit that receives luminance values of an image and a content map. The content map identifies categories of content in segments of the image. Based on one or more of the identified categories of content, the circuit determines a content factor associated with a pixel. The content factor may also be based on a texture and/or chroma values. A texture value indicates a likelihood of a category of content and is based on detected edges in the image. A chroma value indicates a likelihood of a category of content and is based on color information of the image. The circuit receives the content factor and applies it to a version of the luminance value of the pixel to generate a sharpened version of the luminance value.

20 Claims, 11 Drawing Sheets

(51) Int. Cl.
*G06T 5/70* (2024.01)
*G06T 7/10* (2017.01)

(56) References Cited

U.S. PATENT DOCUMENTS

| | | | | |
|---|---|---|---|---|
| 6,738,494 B1* | 5/2004 | Savakis | ............... | G06T 7/66 |
| | | | | 382/254 |
| 7,876,833 B2 | 1/2011 | Segall et al. | | |
| 8,264,610 B2 | 9/2012 | Garg et al. | | |
| 8,724,919 B2 | 5/2014 | Pillman et al. | | |
| 9,916,518 B2 | 3/2018 | Ueda et al. | | |
| 2002/0094128 A1* | 7/2002 | Shu | ............... | H04N 9/3179 |
| | | | | 348/E5.077 |
| 2003/0026495 A1* | 2/2003 | Gondek | ............... | G06T 5/20 |
| | | | | 382/199 |
| 2003/0102091 A1 | 6/2003 | Liao | | |
| 2003/0108245 A1* | 6/2003 | Gallagher | ............... | G06T 5/004 |
| | | | | 382/266 |
| 2003/0108250 A1* | 6/2003 | Luo | ............... | G06V 10/56 |
| | | | | 358/518 |
| 2003/0161544 A1* | 8/2003 | Gallagher | ............... | G06T 5/004 |
| | | | | 382/264 |
| 2003/0161545 A1* | 8/2003 | Gallagher | ............... | G06T 5/004 |
| | | | | 382/224 |
| 2006/0093234 A1* | 5/2006 | Silverstein | ............... | G06T 5/70 |
| | | | | 382/255 |
| 2007/0242160 A1 | 10/2007 | Garg et al. | | |
| 2008/0199101 A1* | 8/2008 | Sumiya | ............... | G06T 5/002 |
| | | | | 382/266 |
| 2008/0267524 A1* | 10/2008 | Shaked | ............... | G06T 5/003 |
| | | | | 382/263 |
| 2008/0298704 A1* | 12/2008 | Nachlieli | ............... | G06T 5/008 |
| | | | | 382/254 |
| 2009/0148015 A1* | 6/2009 | Bohm | ............... | G06T 5/002 |
| | | | | 382/128 |
| 2009/0169074 A1* | 7/2009 | Avinash | ............... | G16H 30/40 |
| | | | | 382/128 |
| 2010/0074548 A1* | 3/2010 | Pan | ............... | G06T 5/004 |
| | | | | 382/260 |
| 2010/0149420 A1* | 6/2010 | Zhang | ............... | H04N 9/73 |
| | | | | 348/E9.051 |
| 2010/0225785 A1* | 9/2010 | Shimizu | ............... | H04N 1/6086 |
| | | | | 348/E9.053 |
| 2010/0246939 A1* | 9/2010 | Aisaka | ............... | H04N 5/144 |
| | | | | 382/156 |
| 2010/0302396 A1* | 12/2010 | Golub | ............... | G02B 5/001 |
| | | | | 348/222.1 |
| 2011/0090351 A1* | 4/2011 | Cote | ............... | H04N 23/951 |
| | | | | 348/208.1 |
| 2012/0045095 A1* | 2/2012 | Tate | ............... | G06T 7/75 |
| | | | | 382/103 |
| 2012/0093402 A1* | 4/2012 | Staelin | ............... | G06T 5/008 |
| | | | | 382/165 |
| 2012/0281133 A1* | 11/2012 | Kurita | ............... | H04N 23/6811 |
| | | | | 348/E5.037 |
| 2013/0216153 A1* | 8/2013 | Hsu | ............... | G06T 5/002 |
| | | | | 382/266 |
| 2014/0003734 A1* | 1/2014 | Umansky | ............... | G06T 5/73 |
| | | | | 382/275 |
| 2014/0085507 A1* | 3/2014 | Pillman | ............... | G06T 7/0002 |
| | | | | 382/173 |
| 2014/0086486 A1* | 3/2014 | Pillman | ............... | G06T 7/194 |
| | | | | 382/173 |
| 2014/0185956 A1* | 7/2014 | Kawata | ............... | G06V 10/30 |
| | | | | 382/275 |
| 2014/0193032 A1* | 7/2014 | Zhang | ............... | G06T 3/0012 |
| | | | | 382/103 |
| 2014/0193094 A1* | 7/2014 | Shin | ............... | G06T 5/20 |
| | | | | 382/264 |
| 2016/0063681 A1* | 3/2016 | Esaki | ............... | G06T 5/00 |
| | | | | 382/199 |
| 2016/0381249 A1 | 12/2016 | Eguchi | | |
| 2017/0061567 A1 | 3/2017 | Lim et al. | | |
| 2017/0061584 A1* | 3/2017 | Lim | ............... | G06T 5/002 |
| 2018/0007334 A1 | 1/2018 | Lim et al. | | |

FOREIGN PATENT DOCUMENTS

| | | |
|---|---|---|
| CN | 110858903 A | 3/2020 |
| EP | 1318459 A1 | 6/2003 |
| EP | 1318475 A1 | 6/2003 |
| EP | 1347415 A1 | 9/2003 |
| JP | 2004254158 A | 9/2004 |
| JP | 4323791 B2 | 6/2009 |
| JP | 2013256831 A | 12/2013 |
| JP | 2015023445 A | 2/2015 |
| JP | 2017007243 A | 1/2017 |

OTHER PUBLICATIONS

Jiang, H. et al. "Fluorescence microscopic image restoration based on Gabor wavelet decomposition and gain map constraint", Computer Engineering and Applications, 2015, vol. 51, No. 15, pp. 157-160.

Li, H. et al. "Comparison for image segmentation algorithms with smoothing processing", Journal of Guangxi University (Natural Science Edition) Dec. 2017, vol. 42, No. 6, 12 pages.

German Office Action directly related to German Patent Application No. 112021002288.1, mailed Oct. 17, 2023, 17 pages.

\* cited by examiner

CONTENT BASED IMAGE PROCESSING

CROSS-REFERENCE TO RELATED APPLICATION

This patent application is a continuation of U.S. patent application Ser. No. 16/846,904 filed on Apr. 13, 2020, which is hereby incorporated by reference in its entirety.

BACKGROUND

1. Field of the Disclosure

The present disclosure relates to a circuit for processing images and more specifically to sharpening segments of an image differently based on content in the image.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

Image processing pipelines often include sharpening or smoothing processes. These processes are implemented using one or more tuning parameters that are uniformly applied across the entire image. Due to this, one or more segments of content in the image may be smoothed or sharpened in ways that negatively affect the appearance of the final image.

Similarly, other image processing processes, such as tone mapping, white balancing, and noise reduction, are also implemented using one or more tuning parameters that are generally uniformly applied across the entire image. Due to this, one or more segments of content in the image may be processed in ways that negatively affect the appearance of the final image.

SUMMARY

Some embodiments relate to an image processor that includes a content image processing circuit that determines a content factor using a content map that identifies categories of content in segments of an image. The content image processing circuit includes a content factor circuit and a content modifying circuit that is coupled to the content factor circuit. The content factor circuit determines the content factor associated with a pixel of the image according to the identified categories of content in the image and at least one of texture values of pixels in the image or chroma values of pixels in the image. A texture value indicates a likelihood of a category of content that is associated with the pixel based on a texture in the image. A chroma value indicates a likelihood of a category of content that is associated with the pixel based on color information of the image. The content modifying circuit receives the content factor from the content factor circuit. The content modifying circuit generates a sharpened version of a luminance pixel value of the pixel by at least applying the content factor to a version of a luminance pixel value of the pixel.

In some embodiments, the content map is generated by a neural processor circuit that performs a machine learned operation on a version of the image to generate the content map.

In some embodiments, the content map is downscaled relative to the image. The content factor circuit may determine the content factor by upsampling the content map. The content map may be upsampled by: (1) obtaining content factors associated with grid points in the content map, and (2) interpolating the content factors associated with grid points surrounding the pixel when the content map is enlarged to match the size of the image.

In some embodiments, the content factor is weighted according to a likelihood value. The likelihood value is based on one of the identified categories of the content in the image, a texture value, and a chroma value.

In some embodiments, the luminance pixel values are included in first information of the image when the luminance version of the image is split into the first information and second information including frequency components lower than frequency components of the first component.

In some embodiments, the image processor includes a bilateral filter coupled to the content image processing circuit. The bilateral filter produces the version of the luminance pixel value.

In some embodiments, the content modifying circuit applies the content factor to the version of the luminance pixel value by multiplying the content factor with the version of the luminance pixel value when the content factor is above a threshold. The content modifying circuit applies the content factor to the version of the luminance pixel value by blending the version luminance pixel value based on the content factor responsive to the content factor being below the threshold.

In some embodiments, the content map is a heat map indicating an amount of sharpening to be applied to pixels of the image corresponding to grid points in the content map.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to sharpening segments of an image based on content within the segments as indicated by a content map. A content factor for a pixel or a segment of the image is determined based on one or more of the identified categories of content associated with the pixel or the segment. The content factor may also be adjusted based on a set of texture values and/or a set of chroma values. A texture value indicates a likelihood of one of the identified categories of content and is based on a texture in the image. A chroma value indicates a likelihood of one of the identified categories of content and is based on color information of the image. The content factor is applied to the pixel or the segment to generate a sharpened version of the luminance value.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
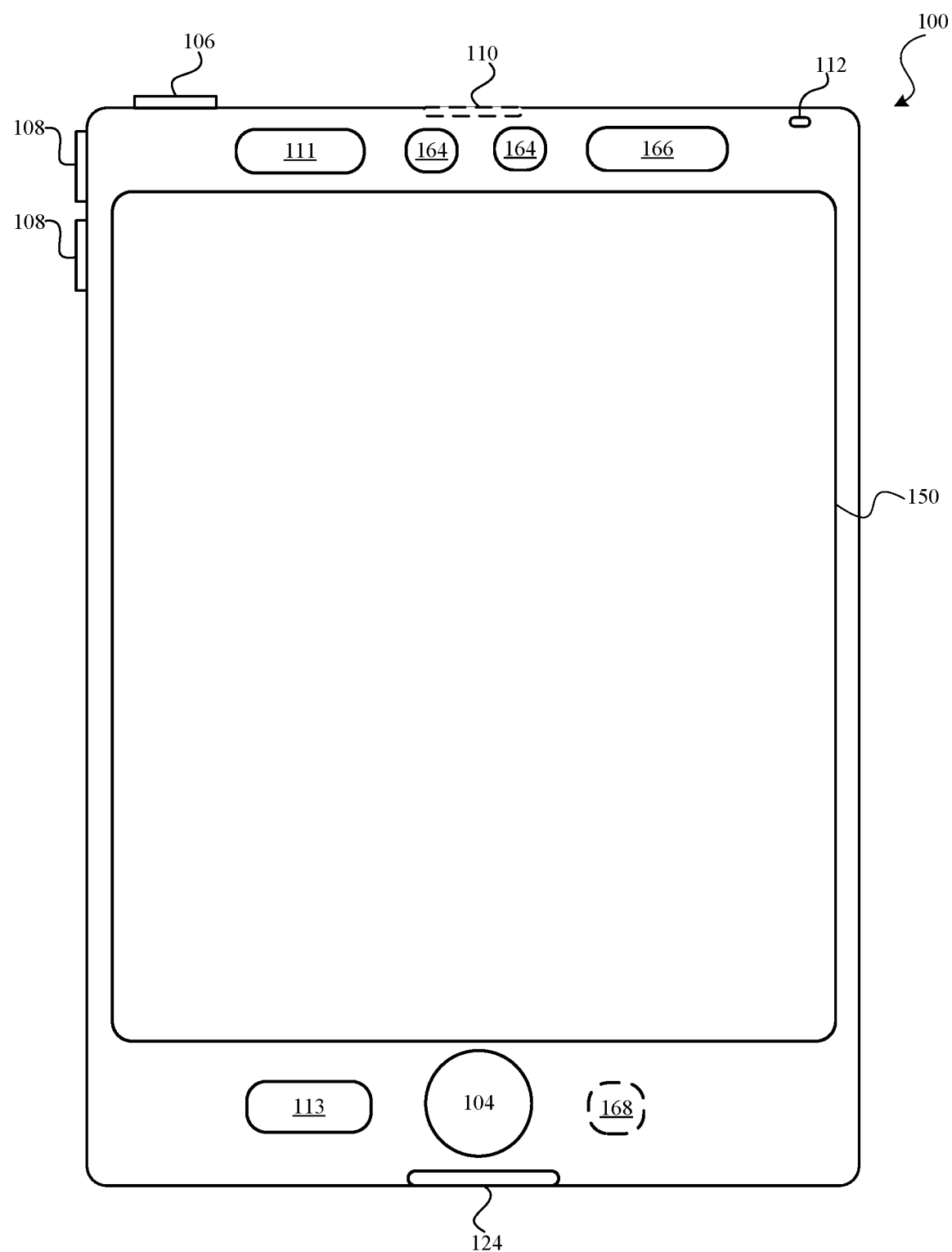
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
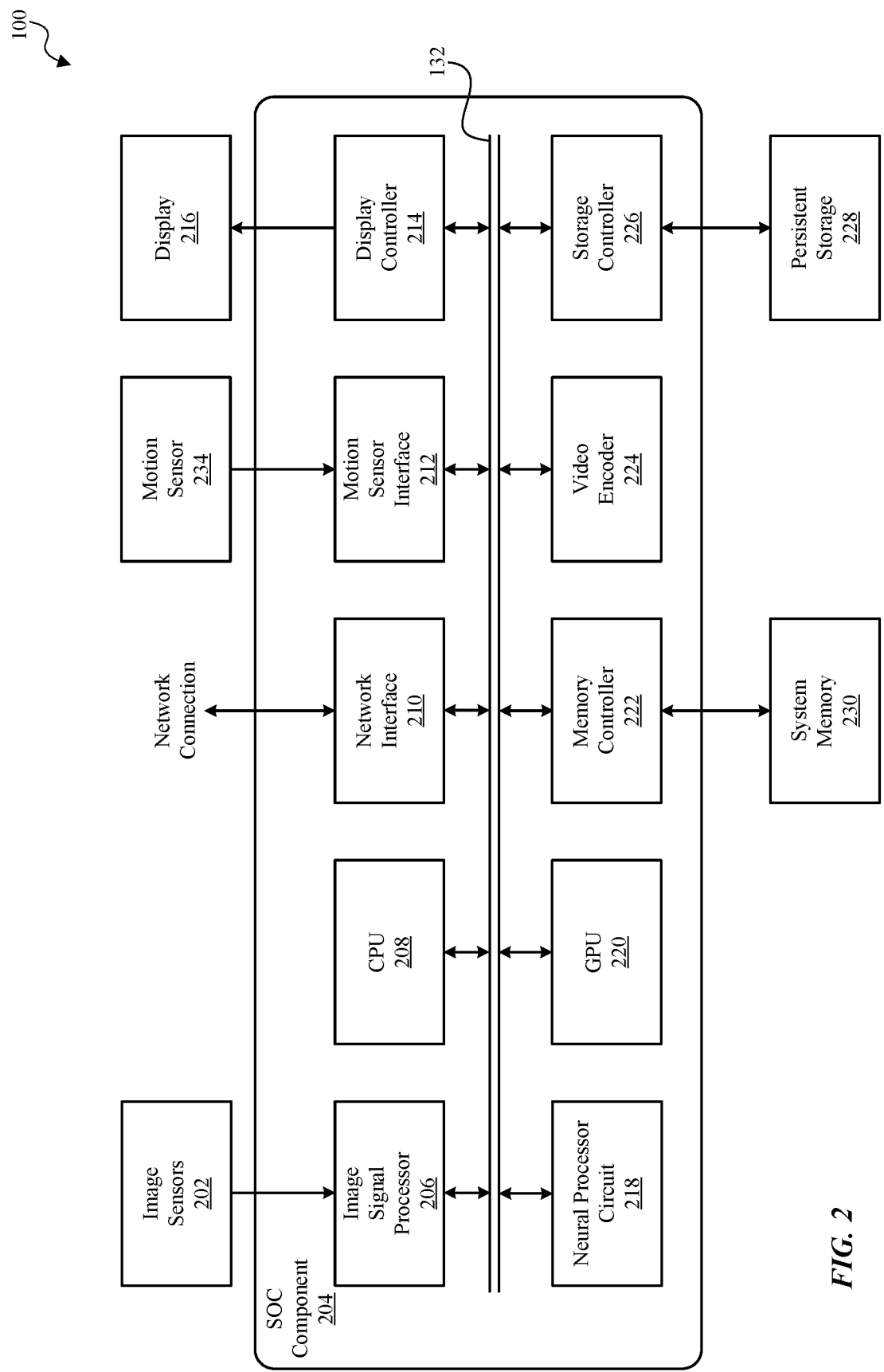
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the focal length of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, a neural processor circuit 218, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

The neural processor circuit 218 is a programmable circuit that performs machine learning operations on the input data of neural processor circuit 218. Machine learning operations may include different computations for training of a machine learning model and for performing inference or prediction based on the trained machine learning model. The neural processor circuit 218 is a circuit that performs various machine learning operations based on computation including multiplication, addition, and accumulation. Such computation may be arranged to perform, for example, various types of tensor multiplications such as tensor product and convolution of input data and kernel data. The neural processor circuit 218 is a configurable circuit that performs these operations in a fast and power-efficient manner while relieving CPU 208 of resource-intensive operations associated with neural network operations. The neural processor circuit 218 may receive the input data from sensor interface 212, the image signal processor 206, persistent storage 228, system memory 230 or other sources such as network interface 210 or GPU 220. The output of the neural processor circuit 218 may be provided to various components of device 100 such as image signal processor 206, system memory 230 or CPU 208 for various operations.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
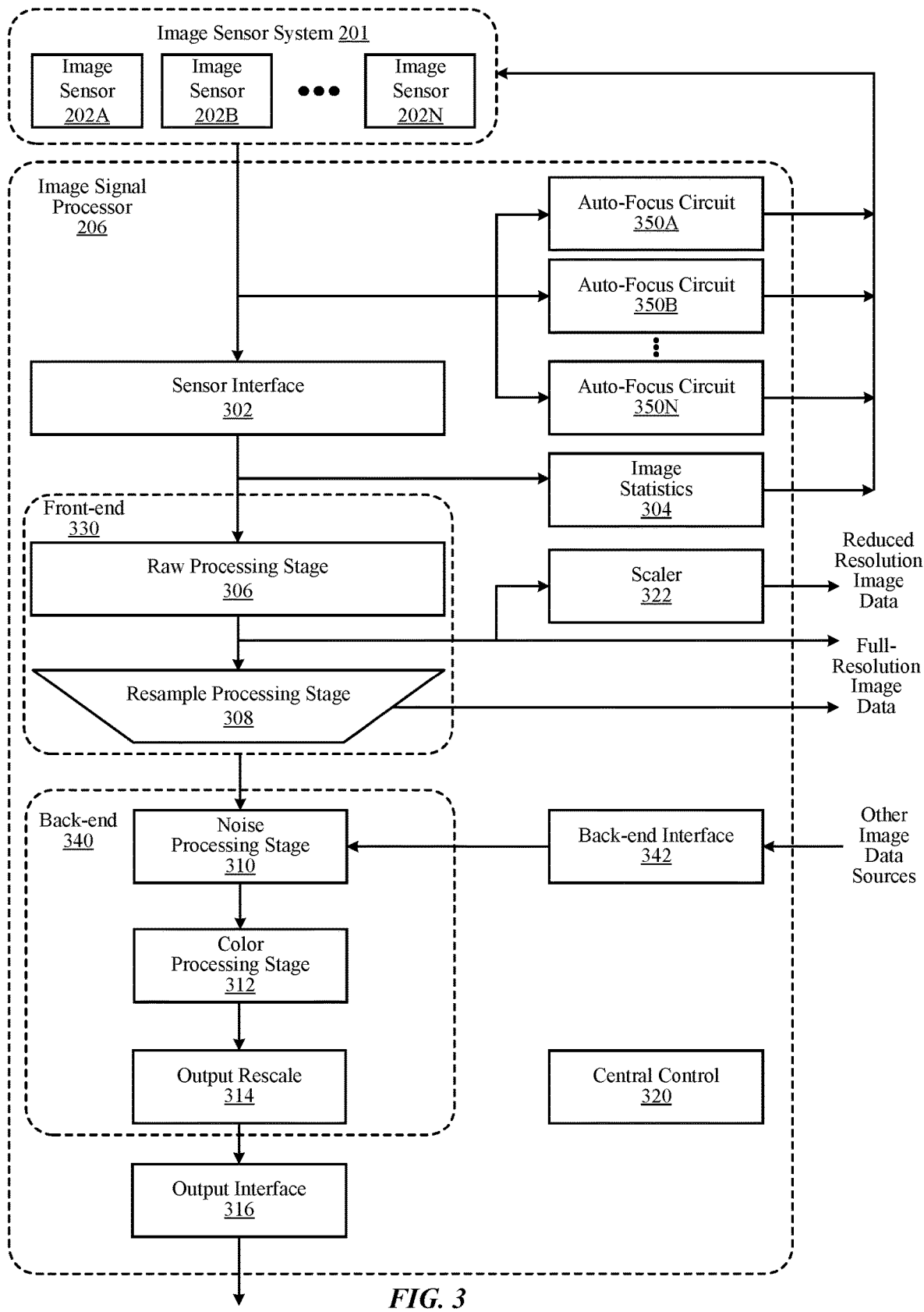
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may share the same circuit board that controls the mechanical components of the image sensors (e.g., actuators that change the focal lengths of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, a scaler 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate focal length of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate focal length. The image processing operations may include cropping, binning, image compensation, scaling to generate data that is used for auto-focusing purpose. The auto-focusing data generated by auto-focus circuits 350 may be fed back to the image sensor system 201 to control the focal lengths of the image sensors 202. For example, an image sensor 202 may include a control circuit that analyzes the auto-focusing data to determine a command signal that is sent to an actuator associated with the lens system of the image sensor to change the focal length of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the focal length of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its focal length because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, the resample processing stage 308 converts RGG format into YCbCr format for further processing. In another embodiment, the resample processing stage 308 concerts RBD format into RGB format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

The scaler 322 receives image data and generates a downscaled version of the image. Thus, the scaler 322 may provide reduced resolution images to various components, such as the neural processor circuit 218. While the scaler 322 is coupled to the raw processing stage 306 in FIG. 3, the scaler 322 may be coupled to receive an input image from other components of the image signal processor 206.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, the output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipeline Associated with Multiple Band Noise Reduction Circuit

Figure 4:
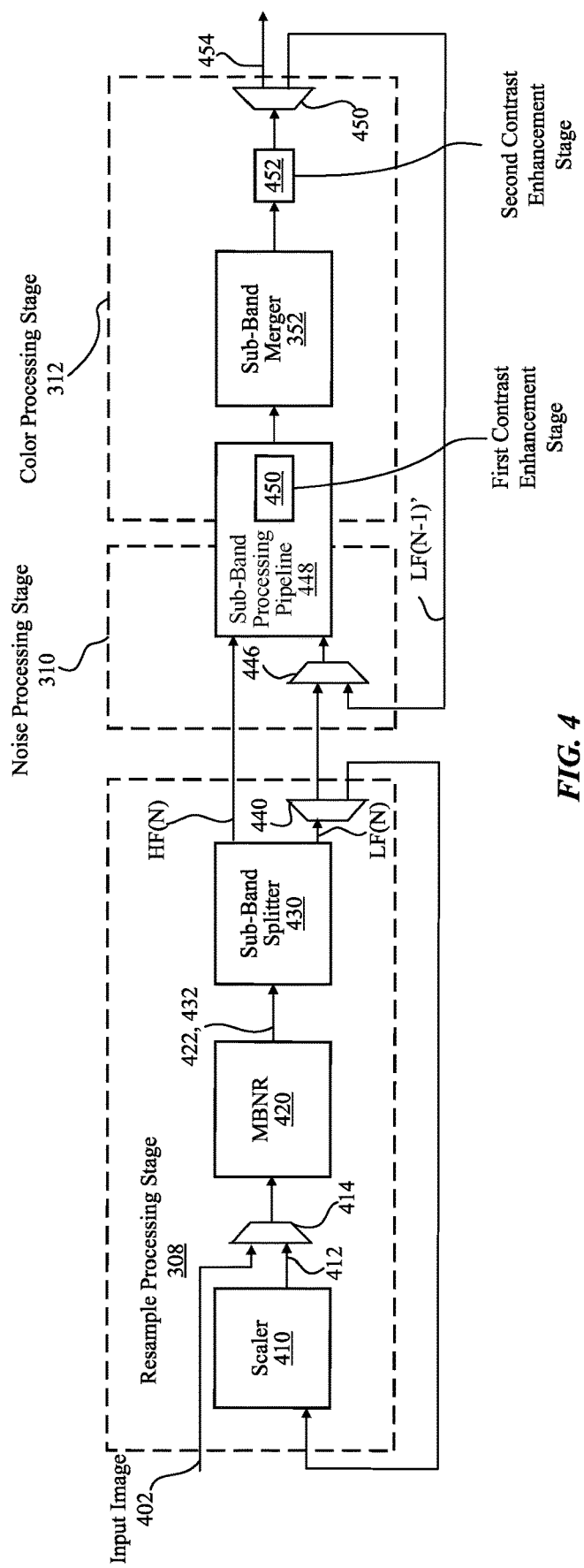
FIG. 4 is a block diagram illustrating a portion of the image processing pipeline including a multiple band noise reduction circuit, according to one embodiment.

FIG. 4 is a block diagram illustrating a portion of the image processing pipeline including a multiple band noise reduction (MBNR) circuit 420, according to one embodiment. In the embodiment of FIG. 4, MBNR circuit 420 is part of a resample processing stage 308 that also includes, among other components, a scaler 410 and a sub-band splitter circuit 430. The resample processing stage 308 performs scaling, noise reduction, and sub-band splitting in a recursive manner.

As a result of recursive processing, the resample processing stage 308 outputs a series of high frequency component image data HF(N) and low frequency component image data LF(N) derived from an original input image 402 where N represents the levels of downsampling performed on the original input image 402. For example, HF(0) and LF(0) represent a high frequency component image data and a low frequency component image data split from the original input image 402, respectively, while HF(1) and LF(1) represent a high frequency component image data and a low frequency component image data split from a first downscaled version of the input image 402, respectively.

MBNR circuit 420 is a circuit that performs noise reduction on multiple bands of the input image 402. The input image 402 is first passed on through a multiplexer 414 to MBNR circuit 420 for noise reduction. The noise reduced version 422 of the original input image 402 is generated by MBNR circuit 420 and fed to a sub-band splitter 430. The sub-band splitter 430 splits the noise reduced version 422 of the original input image 402 into the high frequency component image data HF(0) and the low frequency component image data LF(0). The high frequency component image data HF(0) is passed onto a sub-band processing pipeline 448 and then to a sub-band merger 352. In contrast, the low frequency component image LF(0) is passed through a demultiplexer 440 and is fed back to the resample processing stage 308 for downscaling by a scaler 410.

The scaler 410 generates a downscaled version 412 of the low frequency component image LF(0) fed to the scaler 410, and passes it onto MBNR circuit 420 via the multiplexer 414 for noise reduction. MBNR circuit 420 performs noise reduction to generate a noise reduced version 432 of the downscaled image 412 and sends it to the sub-band splitter 430 to again split the processed low frequency image data LF(0) into the high frequency component image data HF(1) and the low frequency component image data LF(1). The high frequency component image data HF(1) is sent to the sub-band processing pipeline 448 and then the sub-band merger 352 whereas the low frequency component image data LF(1) is again fed back to the scaler 410 to repeat the process within the resample processing stage 308. The process of generating a high frequency component image data HF(N) and a low frequency component image data LF(N) is repeated until the final level of band-splitting is performed by the sub-band splitter 430. When the final level of band-splitting is reached, the low frequency component image data LF(N) is passed through the demultiplexer 440 and a multiplexer 446 to the sub-band processing pipeline 448 and the sub-band merger 352.

As described above, MBNR circuit 420 performs noise reduction on the input image 402 as well as its downscaled low frequency versions of the input image 402. This enables MBNR circuit 420 to perform noise reduction on multiple bands of the original input image 402. It is to be noted, however, that only a single pass of noise reduction may be performed on the input image 402 by MBNR circuit 420 without sub-band splitting and scaling.

The sub-band merger 352 merges processed high frequency component image data HF(N)' and processed low frequency component image data LF(N)' to generate a processed LF(N−1)'. The processed LF(N−1)' is then fed back to the sub-band merger 352 via the demultiplexer 450 and the multiplexer 446 for merging with the processed HF(N−1)' to generate a processed LF(N−2)'. The process of combining the processed high frequency component image data and the processed low frequency component data is repeated until the sub-band merger 352 generates a processed version 454 of input image that is outputted via the demultiplexer 450.

The first contrast enhancement stage 450 and the second contrast enhancement stage 452 perform sharpening or smoothing operations to segments of image data based on content associated with segments of the image. The first contrast enhancement stage 450 is a component of the sub-band processing pipeline 448 and performs sharpening operation on high frequency component image data HF (N) that is scaled down relative to input image 402. The second contrast enhancement stage 452, on the other hand, performs sharpening on an output of sub-band merger 352 that may be a full resolution image data having the same spatial size as input image 402. The first and second contrast enhancement stages 450, 452 are further described with reference to FIG. 7

Example Pipeline Associated with Content Map

Figure 5:
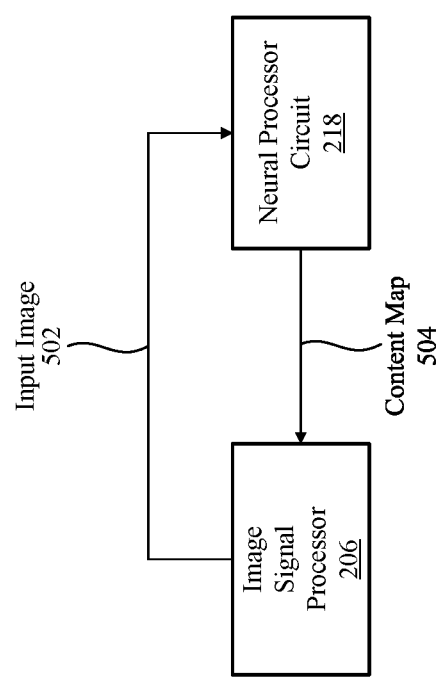
FIG. 5 is a block diagram illustrating a neural processor circuit providing a content map to the image signal processor, according to one embodiment.

FIG. 5 is a block diagram illustrating providing of a content map 504 (also referred to as a "segmentation map" herein) by neural processor circuit 218 to image signal processor 206, according to an embodiment. Image signal processor 206 provides an input image 502 to the neural processor circuit 218. The input image 502 may be the same or different compared to original input image 402. Based on the input image 502, the neural processor circuit 218 generates a content map 504 and provides the content map 504 to the image signal processor 206. For example, content map 504 is sent to contrast enhancement stages 450, 452.

Figure 6B:
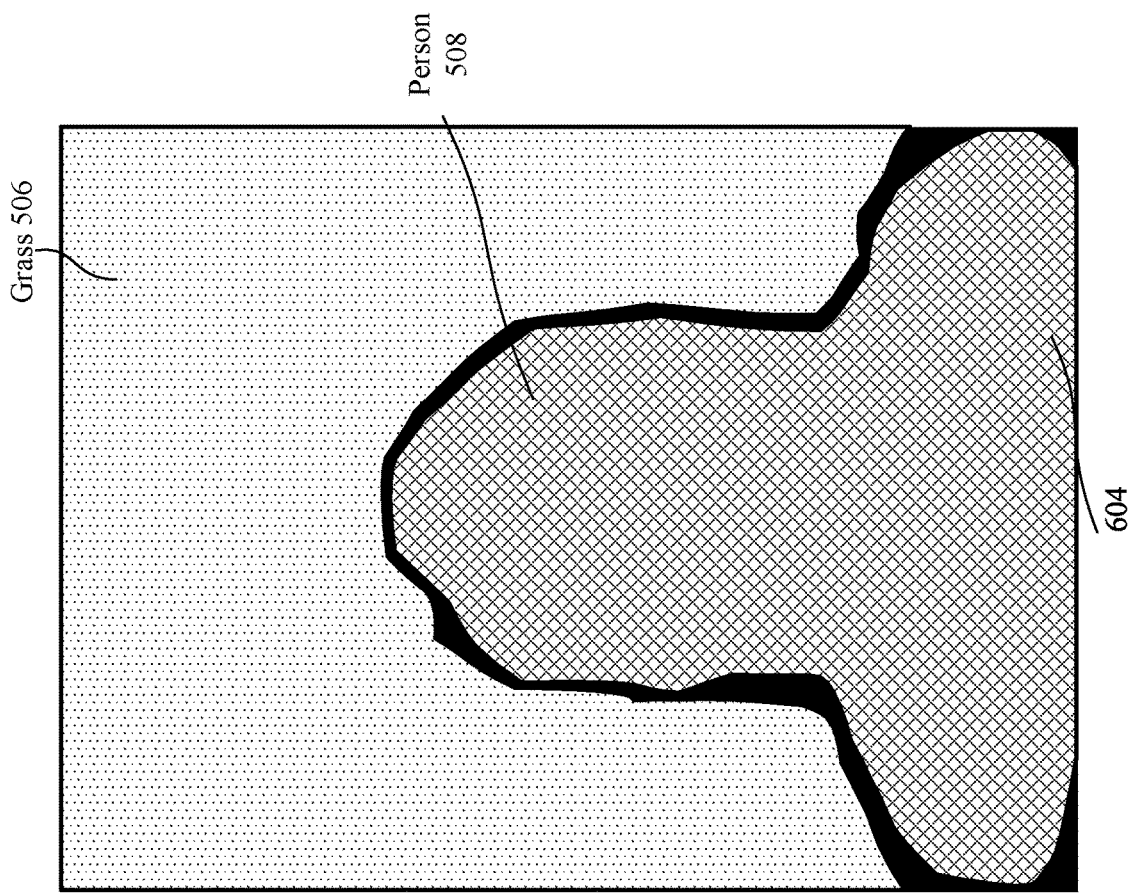
FIG. 6B is a content map based on the input image of FIG. 6A, according to one embodiment.
Figure 6A:
FIG. 6A is an example input image for the neural processor circuit, according to one embodiment.

As previously described with reference to FIG. 2, neural processor circuit 218 may be machine learned. Thus, neural processor circuit 218 may determine the content map 504 by performing one or more machine learned operations on the input image 502. In some embodiments, the input image 502 is a reduced resolution image (e.g., provided by the scaler 322) compared to the original input image 402. Reducing the resolution of the image may decrease the processing time for generating content map 504. However, since the resolution of the content map 504 is typically the same or similar to the resolution of the input image 502, the content map 504 may be downscaled relative to the original input image 402. An example input image 602 is provided in FIG. 6A and an example content map 604 is provided in FIG. 6B. The content map 604 identifies grass 506 and a person 508 in the image 602.

Each segment of content may be associated with one or more predetermined categories of content. The content map 504 may be associated with a grid having a plurality of grid points that are used during upscaling process. The content map 504 may be the same size as the full-scale image. In some embodiments, to facilitate various processing, the number of grid points are fewer than the number of pixels in the full-scale image for sharpening. In one or more embodiments, each grid point of the map may be associated with a category of content (also referred to as "content category" herein), and may be used for determining a content factor for nearby pixels in a full-scale image, as described below in detail with reference to FIG. 11.

Examples of content categories in a content map 504 have different desirable content factors. Different content categories may include skin, foliage, grass, and sky. It is generally desirable to sharpen certain categories (e.g., foliage and grass) relative to other categories (e.g., skin). In one or more embodiments, neural processor circuit 218 is trained using various machine learning algorithm to classify different segments of the input image 502 to identify content categories for the content in the input image 502, which in turn, is used by image signal processor 206 to sharpen different segments of the input image 502 with different content factors that indicate the degree of sharpening to be applied to the different segments, as described below in detail with reference to FIG. 8.

In other embodiments, neural processor circuit 218 is trained using various machine learning algorithm to generate a heat map as the content map 504. The heat map directly indicates the degree of desirable sharpening at different segments of the input image 502 rather than indicating the content categories associated with the different segments.

Example Contrast Enhancement Stage Circuit

Figure 7:
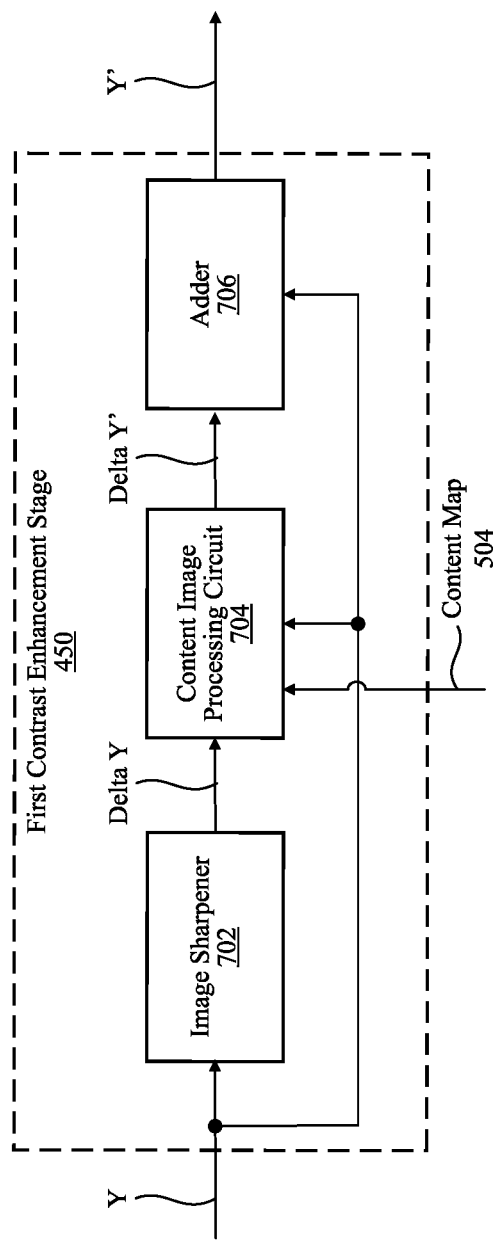
FIG. 7 is a block diagram illustrating components of a first contrast enhancement stage circuit, according to one embodiment.

FIG. 7 is a block diagram illustrating components of first contrast enhancement stage circuit 450, according to an embodiment. First contrast enhancement state circuit 450 performs content based image sharpening and smoothing on luminance information Y to produce a sharpened version of luminance information Y'. Luminance information Y refers to an image including only luminance components of input image 402, and sharpened luminance information Y' refers an image including only luminance components of output image. First contrast enhancement stage circuit 450 may include, among other components, an image sharpener 702, a content image processing 704, and an adder circuit 706. Second contrast enhancement stage circuit 452 has substantially the same structure as first contrast enhancement stage circuit 450 except that the luminance image is not downscaled relative to the full input image 402, and therefore, a detailed description thereof is omitted herein for the same of brevity.

Image sharpener 702 is a circuit that performs contrast enhancement (e.g., sharpening) on luminance information Y and generates output Delta Y. Delta Y represents a mask of Y. For example, Delta Y is a result of an unsharp masking process. In one or more embodiments, image sharpener 702 is embodied as a bilateral filter or a high-pass frequency filter that performs processing on luminance information Y. Thus, for example, Delta Y may be a high frequency component of the image. Delta Y is further adjusted by downstream components of first contrast enhancement stage 450.

Content image processing 704 is a circuit that adjusts Delta Y based on content categories as identified by content map and likelihood of such classification. Content image processing 704 receives luminance information Y and the content map 504, and generates adjusted Delta Y' that is increased or decreased relative to Delta Y depending on the desired degree of sharpening based on the content categories, as described further with respect to FIG. 8.

In some embodiments, adder circuit 706 adds the adjusted Delta Y' from the content image processing 704 to the luminance information Y to produce sharpened luminance information Y'. In some embodiments, adder circuit 706 adds the adjusted Delta Y' to low frequency components of the luminance information Y (e.g., where low frequency components=Y−delta Y). For some pixels, adjusted Delta Y' is positive whereby the adding at adder circuit 706 results in sharpening of a related segment of image. For pixels with adjusted Delta Y' that is negative whereby the adder circuit 706 performs a blurring operation, such as alpha blurring. As further described below, Delta Y may be alpha blurred with the low frequency component of the luminance information Y. This may result in the blurring being bounded to the low frequency component. This may prevent image artifacts that may occur in cases where Delta Y' include large negative values.

Example Content Image Processing Circuit

Figure 8:
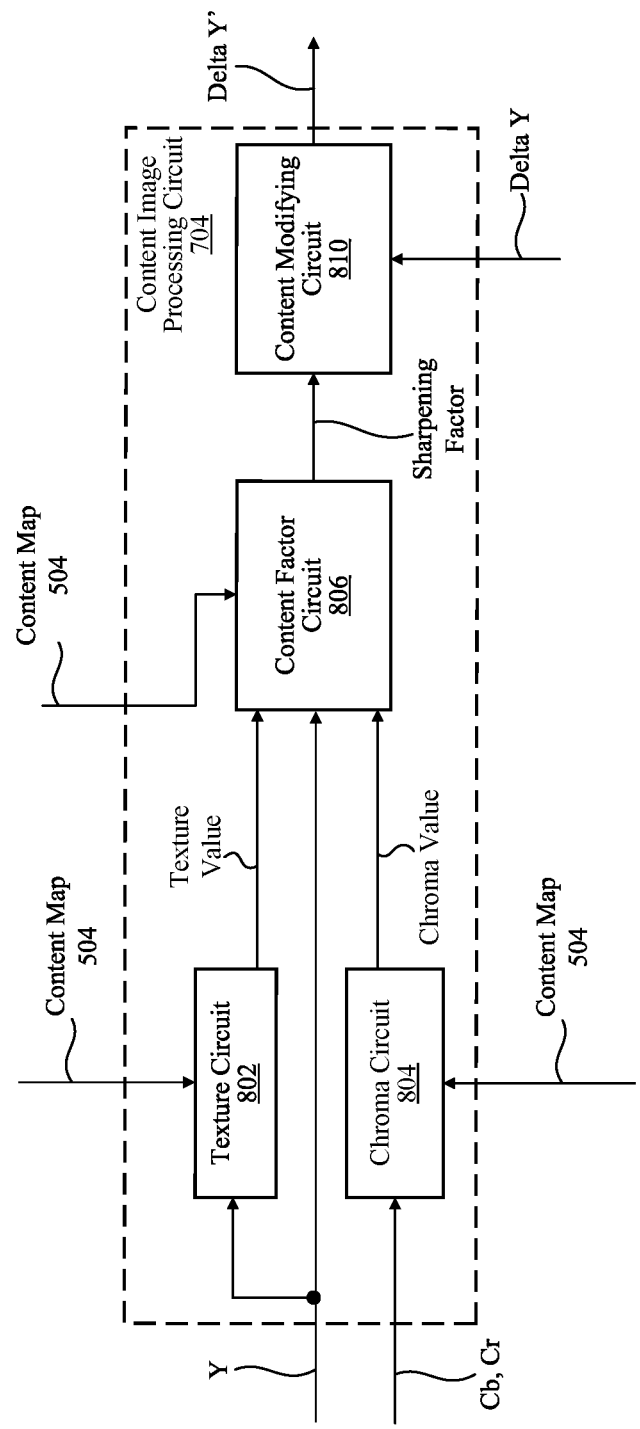
FIG. 8 is a block diagram illustrating components of a content image processing circuit, according to one embodiment.

FIG. 8 is a block diagram illustrating components of content image processing 704, according to an embodiment. As previously stated with reference to FIG. 7, content image processing 704 performs sharpening and smoothing operations based on content in the image. The content image processing 704 may include, among other components, a texture circuit 802, a chroma circuit 804, a content factor circuit 806, and a content modifying circuit 810.

Content factor circuit 806 determines content factors for pixels in the input image. A content factor may be determined for each pixel in the input image. A content factor is based on one or more values in the content map and indicates an amount of sharpening to be applied to a pixel. A content factor may also be based on one or more texture values from texture circuit 802 and/or chroma values from chroma circuit 804.

As previously described, content categories of the content map may be associated with content factors. For example, a content factor is predetermined for each content category. If a content map has a same resolution as the image, a content factor for a pixel may be obtained by referencing information for a corresponding location in the content map. If the content map is downscaled compared to the image, the content map may be upscaled to match the size of the input image so that a content factor can be interpolated from nearby pixels in an upscaled version of the content map. A grid with multiple grip points may be overlaid on the input image, and information associated with the grid points may be used to determine information for pixels in the full image by interpolation. For example, if a pixel location of the full image not coinciding with a grid point in the content map (e.g., the pixel is located between a set of grid points), the content factor for the pixel may be determined by interpolating content factors of grid points proximate (e.g., surrounding) the pixel. Upsampling the content map to determine a content factor for a pixel between grid points is further described with respect to FIG. 11.

In some embodiments, a content factor is weighted according to a likelihood value. For example, a content factor Q for a pixel is determined by multiplying an initial content factor $Q_0$ by a likelihood value:

$$Q=(Q_0)*(\text{Likelihood Value}) \quad (1)$$

where the initial content factor $Q_0$ is the content factor associated with a certain content category. The likelihood value may be based on the content category of the pixel and a texture value and/or a chroma value of the pixel as described below with reference to texture circuit 802 and chroma circuit 804. In some embodiments, the likelihood value is determined by a likelihood model, such as:

$$(\text{Likelihood Value})=C_1+C_2*(\text{Texture Value})+C_3*(\text{Chroma Value}) \quad (2)$$

where $C_1$, $C_2$, and $C_3$ are predetermined constants (e.g., tuning parameters). The predetermined constants may have values based on content categories in the content map. In some embodiments, the likelihood model is a polynomial function of texture and chroma values. The likelihood model represents a model on accuracy of the classification, and may be determined empirically or by a machine learning process.

Texture circuit 802 is a circuit that determines texture values that represents likelihood that content categories as identified by content map 504 are correct based on texture information. In one or more embodiments, a texture value is determined by applying one or more edge detection operations to the input image. For example, edges detection methods such as a Sobel filter or a high-pass frequency filter is applied to a luminance input image to obtain edge values at pixel locations of the input image. After the edge values are determined, a texture value for a grid point may be determined by applying an edge value to a texture model. The texture circuit 802 may store multiple different texture models corresponding to different content categories. Examples of texture models include a foliage texture model, a sky texture model, a grass texture model, and a skin texture model. An example foliage texture model is described below with respect to FIG. 9.

Chroma circuit 804 is a circuit that determines chroma values that represent a likelihood that the content categories as identified by content map 504 are correct based on chroma information. A chroma value is based on color information (e.g., Cb value and Cr value) of the image. The chroma circuit 804 may store different chroma models for different content categories. Examples of chroma models include a foliage chroma model, a sky chroma model, a grass chroma model and a skin chroma model. A chroma model may be manually determined or determined by machine learning techniques. An example sky chroma model is described with respect to FIG. 10.

The content modifying circuit 810 receives content factors from the content factor circuit 806 and delta Y values from the image sharpener 702. The content modifying circuit 810 applies content factors to delta Y values to generate delta Y' values. For example, if a content factor for a pixel is above a predetermined threshold (e.g., 0), the content modifying circuit 810 performs a sharpening operation, such as multiplying the content factor of the pixel to a delta Y value of the pixel. If a content factor for a pixel is below the predetermined threshold, the content modifying circuit 810 may perform a smoothing operation by blending the delta Y' based on the content factor. For example, alpha blending is performed according to:

$$Y'=(1-\text{alpha})*Y+\text{alpha}*(Y-\text{Delta } Y) \quad (3)$$

and $$Y'=Y+\text{Delta } Y'. \quad (4)$$

Thus, $$\text{Delta } Y'=-(\text{alpha})*(\text{Delta } Y), \quad (5)$$

where alpha=|Q|*scale and alpha is a value between 0 and 1. Scale is a predetermined positive constant. Note that if |Q| is large enough such that |Q|*scale>1, then alpha is clipped to equal 1).

Figure 9:
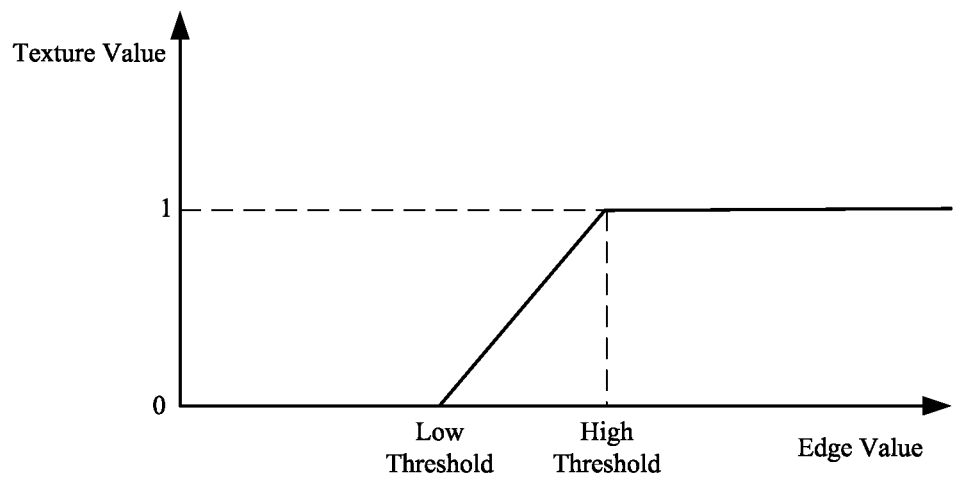
FIG. 9 is a plot illustrating a texture model, according to one embodiment.

FIG. 9 is a plot illustrating a texture model, according to an embodiment. If a pixel (or a grid point, if a grid is used) is categorized as "foliage" by the content map, for example, the texture value may be determined by applying the edge value of the pixel (or the grid point, if a grid is used) to the model of FIG. 9. The x-axis represents input edge values, and the y-axis represents output texture values. The texture values range from 0 to 1. If an edge value of a pixel is above a high threshold, the texture value is 1, and if an edge value is below a low threshold, the texture value is 0. Texture values linearly increase from 0 to 1 for edge values between the low threshold and the high threshold. The values of the low and high thresholds may be determined empirically. For example, the thresholds are set according to edge values that are typical for foliage. Thus, the edge value being above the high threshold may indicate that the pixel or the grid point is at a region with high texture that corresponds to foliage. Similarly, the edge value being lower than the low threshold may indicate that the pixel or the grid point is at a region with a flat texture that does not correspond to foliage. For example, according to Equation 2, high texture values indicate high likelihood that the content of the pixel is foliage (assuming $C_2$ is positive).

For different categories, a corresponding texture model may be represented by different texture parameters (e.g., different low threshold, different high threshold, and/or different slope, and/or flipping of 1 and 0). For category of "grass," the low threshold and the high threshold may be higher than those of category for "foliage." Some categories are likely to be correct when the texture is flat rather than when the texture is complex. For such categories, the 1 and 0 values for the texture value may be flipped. For example, the texture model for "sky" may have 1 value when the edge value is lower (e.g., below a low threshold) and have 0 value when the edge value is higher (e.g., above a high threshold). That is, a pixel is more likely to indicate "sky" when the pixel is in a region of the input image where the texture is flat. In some embodiments, instead of flipping the 1 and 0 values, the predetermined constants in Equation 2 vary based on the content category. For example, for categories such as "skin" or "sky," $C_2$ may be negative such that high texture values indicate a low likelihood that the content of the pixel is "skin" or "sky."

Figure 10:
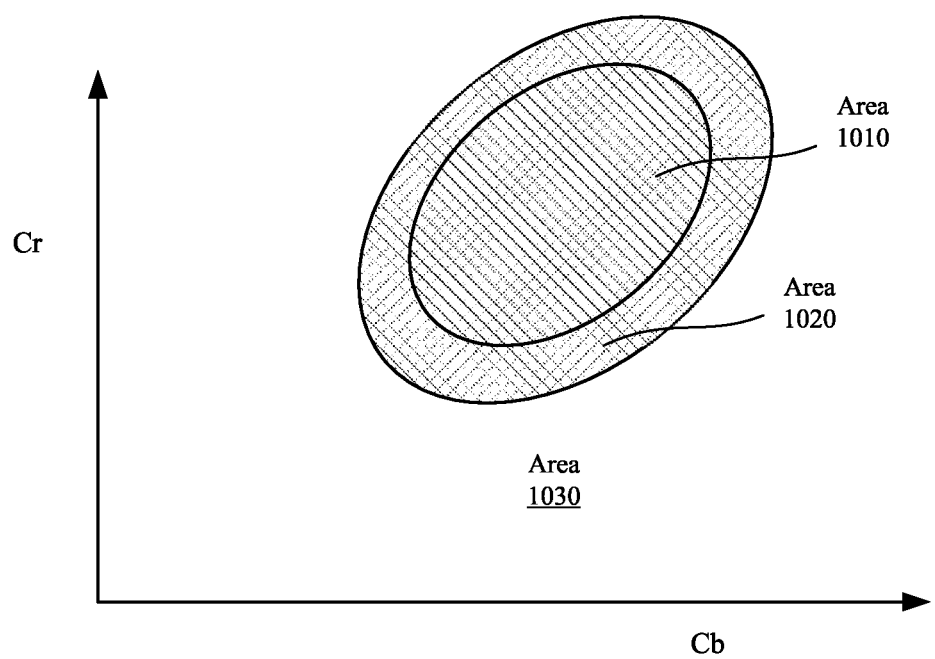
FIG. 10 is a plot illustrating a chroma model, according to one embodiment.

FIG. 10 is a plot illustrating a chroma model, according to an embodiment. The chroma model of FIG. 10 may represent the model of "sky". If a pixel or a grid point is categorized as "sky" by the content map, chroma circuit 804 determines whether the combination of Cb value and Cr values for the pixel or the grid points fall under one of areas 1010, 1020 and 1030. The x-axis represents input Cb values, and the y-axis represents input Cr values. An ellipse is located at the top right corner of the plot that represents the color range of the "sky". If the Cb/Cr values of a pixel or a grid point is within an inner ellipse in area 1010, the chroma value is 1, which (e.g., according to Equation 2 where $C_3$ is positive) may indicate a high likelihood that the pixel or the grid point corresponds to "sky". If the Cb/Cr value is outside of an outer ellipse in area 1030, the chroma value is 0, indicating that the pixel or the grid point is unlikely to correspond to "sky" (e.g., according to Equation 2 where $C_3$ is positive). If Cb/Cr values are between the inner ellipse and the outer ellipse in area 1020, the chroma value may be between 0 and 1 (e.g., the chroma values increase as the distance from the edge inner ellipse increases). The location and size of the ellipse may be determined empirically or through statistic modeling. In some embodiments, other shapes, such as a square, triangle, or circle may be used instead of an ellipse.

For different categories, a corresponding chroma model may be represented by different chroma parameters (e.g., centers, radius, angles, slope of ellipses and ratio of output/ inner ellipses). For example, the chroma model for "foliage" will be generally green, and therefore, the chroma parameter for "foliage" category will cover the Cb/Cr values corresponding to green color whereas the chroma parameter for "sky" category will cover the Cb/Cr values corresponding to blue color. In another example, the chroma parameters are selected according to colors that are generally not associated with a category. For example, "foliage" will generally not include blue. Thus, the chroma model may be configured to output a low value if the Cb/Cr values correspond to blue.

Example Interpolation Using Grid Points

Figure 11:
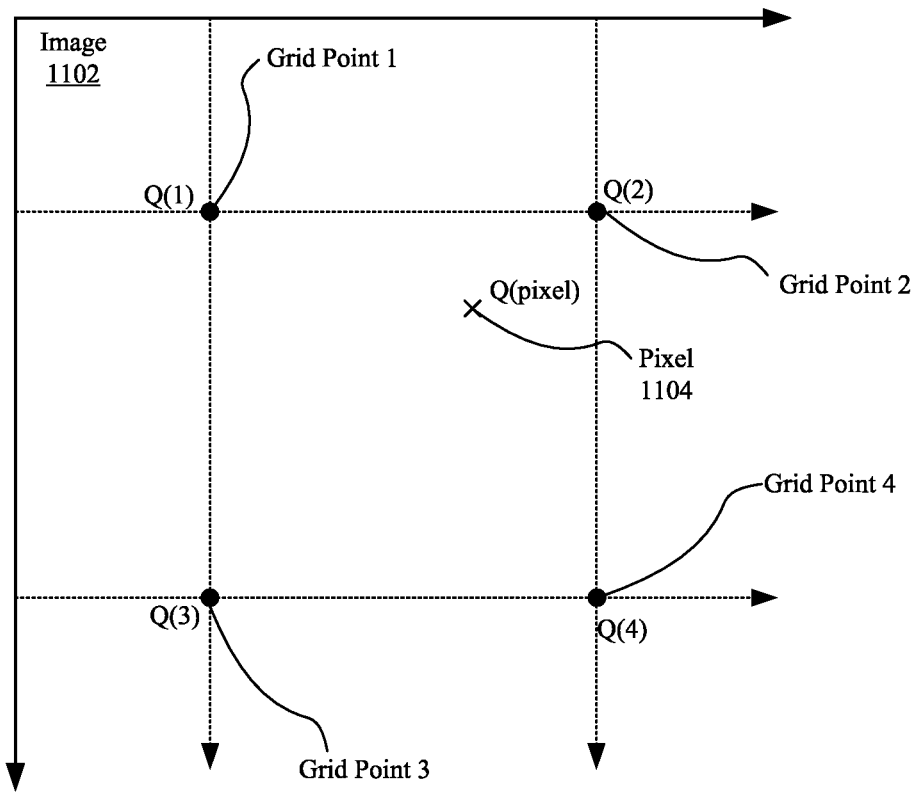
FIG. 11 is a diagram illustrating a method for upsampling a content map, according to one embodiment.

FIG. 11 is a diagram illustrating a method for upsampling a content map, according to an embodiment. If a content map has a lower resolution than the input image, then pixels in the image and pixels in the content map do not have a one-to-one correspondence. Hence, an upscaling of the content map may be performed. One way of performing such upscaling is through the use of a grid with multiple grid points overlaid on top of the input image 1102. The grid points may be sparser than the pixels in the input image 1102. In such case, content factors for the grid points may be used to determine the content factors for the higher resolution input image 1102.

Taking an example where the grid overlaid on the input image 1102 has grid points 1 through 4, and the input image 1102 includes a pixel 1104 which is located between grid points 1 through 4, content factor Q(pixel) for pixel 1104 may be determined by performing a bilinear interpolation on content factors Q(1) through Q(4) associated with grid points 1 through 4 taking into account the spatial distance from grid points to pixel 1104.

In one or more embodiments, content factors Q(1) through Q(4) for determining Q(pixel) for pixel 1104 are determined using the texture parameters and chroma parameters of pixel 1104 of the input image 1102. The categories of grid points 1 through 4 as indicated by the content map is used, but the likelihood values (described above with reference to Equation (2)) for these categories are determined using the edge value and the Cb/Cr values of the pixel 1104 rather than those of the grid points. For example, if grid point 1 is categorized as "skin," the texture of the pixel 1104 is applied to the texture model with texture parameters corresponding to "skin" and the Cb/Cr values of the pixel 1104 are applied to the chroma model with chroma parameters corresponding to "skin" to obtain Q(1) according to Equation (1). Similarly, if grid point 2 is categorized as "foliage," the edge value of the pixel 1104 is applied to the texture model with texture parameters corresponding to "foliage" and the Cb/Cr values of the pixel 1104 are applied to the chroma model with chroma parameters corresponding to "foliage" to obtain Q(2) according to Equation (1). After repeating the same process for grid points 3 and 4, Q(pixel) is obtained by bilateral interpolation.

In other embodiments, content factors Q(1) through Q(4) are obtained by using the texture values and Cb/Cr values of the grid points instead of those of the pixel.

Example Method of Content Based Image Sharpening

Figure 12:
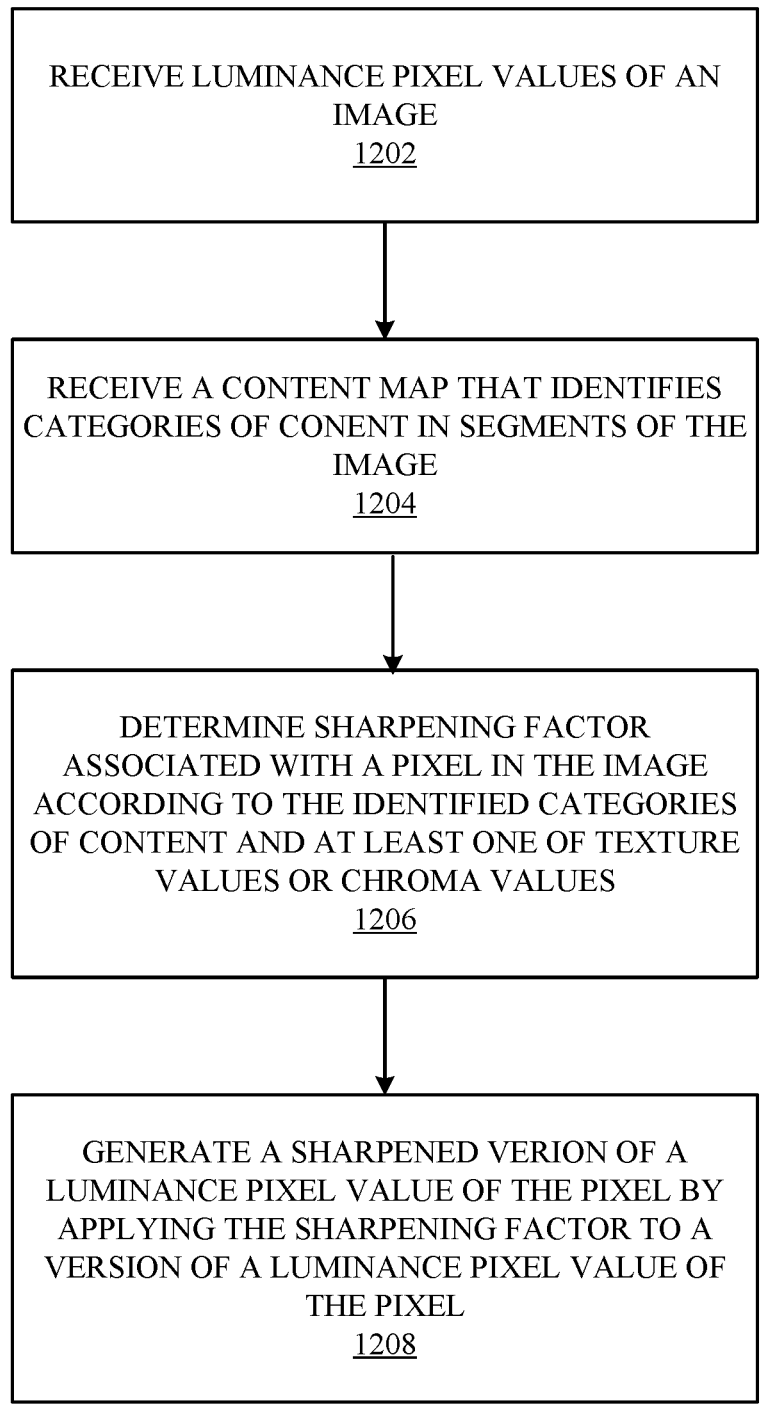
FIG. 12 is a flowchart illustrating a method of sharpening one or more pixels of an image based on content within segments of the image, according to one embodiment.

FIG. 12 is a flowchart illustrating a method of sharpening one or more pixels of an image based on content within segments of the image, according to an embodiment. The steps of the method may be performed in different orders, and the method may include different, additional, or fewer steps.

Luminance pixel values of an input image are received 1202. A content map is received 1204. The content map identifies categories of content in segments of the image. The content map may be generated by a neural processor circuit that performs at least one machine learned operation on a version of the image to generate the content map. The categories identified by the content map may include skin, foliage, grass, or sky. In some embodiments, the content map is a heat map that indicates an amount of sharpening to be applied to pixels of the image.

A content factor associated with a pixel in the image is determined 1206. The content factor is determined according to the identified categories of content in the input image and at least one of texture values of pixels in the image or chroma values of pixels in the image. A texture value indicates a likelihood of a category of content that is associated with the pixel based on a texture in the image. A chroma value indicates a likelihood of a category of content that is associated with the pixel based on color information of the image.

In some embodiments, the content map is downscaled relative to the input image. In these embodiments, the content factor may be determined by upsampling the content map. The content map may be upsampled by obtaining content factors of grid points overlaid on top of the content map, and then interpolating the content factors of the grid points to obtain the content factor for the pixel in the input image.

A sharpened version of a luminance pixel value of the pixel is generated 1208 by at least applying the content factor to a version of a luminance pixel value of the pixel. The version of the luminance pixel values may be produced by a bilateral filter or a high-pass filter. In some embodiments, the content factor is applied to the version of the luminance pixel value by multiplying the content factor with the version of the luminance pixel value responsive to the content factor being above a threshold. If the content factor is below the threshold, the content modifying circuit applies the version of the luminance pixel value is multiplied with a negative parameter.

The teachings described herein relate to generating a content factor for each pixel in an image. The content factor is based on content in the image identified via a content map. While the teachings described herein are in the context of image sharpening, this is for convenience. The teachings described herein can also be applied to other image processing processes, such as, noise reduction, tone mapping, and white balancing processes. For example, for noise reduction, the content factor may be applied (e.g., multiplied) to the noise standard deviation.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for image processing, comprising:
   an image sharpener circuit comprising a high-pass frequency filter and configured to perform contrast enhancement on a luminance image comprising luminance information of a luminance pixel value of a pixel in an image to generate a delta version image of the luminance image, wherein the delta version image includes a high frequency component of the image;
   a content image processing circuit coupled to the image sharpener circuit and configured to receive the delta version image and a content map identifying categories of content in segments of the image wherein the content image processing circuit is further configured to:
   determine a content factor associated with the pixel of the image according to the identified categories of content in the image and at least one of a texture value of the pixel or a chroma value of the pixel, wherein the texture value indicates a likelihood of a category of content associated with the pixel based on a texture in the image, and wherein the chroma value indicates a likelihood of the category of content associated with the pixel based on color information of the image;
   receive the content factor and generate a processed version image of the image by at least applying the content factor to the delta version image; and
   an adder circuit coupled to the content image processing circuit and configured to:
   receive the luminance image and the processed version image; and
   add the processed version image to low frequency components of the luminance information of the luminance image to generate a sharpened luminance image.

2. The apparatus of claim 1, wherein the processed version image comprises a noise reduced version of the luminance pixel value.

3. The apparatus of claim 1, wherein the delta version image includes a tone mapped version of the luminance pixel value.

4. The apparatus of claim 1, wherein the processed version image comprises a white balanced version of the luminance pixel value.

5. The apparatus of claim 1, wherein the delta version image is generated by a bilateral filter applied to the luminance information of the luminance pixel value of the pixel.

6. The apparatus of claim 1, wherein the content image processing circuit is configured to apply the content factor to the delta version image by performing a first image processing operation responsive to the content factor being above a threshold and performing a second different image processing operation responsive to the content factor being below the threshold.

7. The apparatus of claim 6, wherein the first and second image processing operations are noise adjustment operations.

8. The apparatus of claim 6, wherein the first and second image processing operations are tone mapping operations.

9. The apparatus of claim 6, wherein the first and second image processing operations are white balancing operations.

10. A method comprising:
    performing contrast enhancement on a luminance image comprising luminance information of a luminance pixel value of a pixel in an image to generate a delta version image of the luminance image, wherein the delta version image comprises a high frequency component of the image;
    receiving a content map identifying categories of content in segments of the image;
    determining a content factor associated with the pixel of the image according to the identified categories of content in the image and at least one of a texture value of the pixel or a chroma value of the pixel,
    wherein the texture value indicates a likelihood of a category of content associated with the pixel based on a texture in the image, and wherein the chroma value indicates a likelihood of the category of content associated with the pixel based on color information of the image;

generating a processed version image of the image by at least applying the content factor to the delta version image; and adding the processed version image to low frequency components of the luminance information of the luminance image to generate a sharpened luminance image.

11. The method of claim 10, wherein the processed version image comprises a noise reduced version image of the luminance pixel value.

12. The method of claim 10, wherein the delta version image includes a tone mapped version of the luminance pixel value.

13. The method of claim 10, wherein the processed version image comprises a white balanced version of the luminance pixel value.

14. The method of claim 10, wherein the delta version image is generated by a bilateral filter applied to the luminance information of the luminance pixel value of the pixel.

15. The method of claim 10, wherein applying the content factor to the delta version image comprises performing a first image processing operation responsive to the content factor being above a threshold and performing a second different image processing operation responsive to the content factor being below the threshold.

16. An electronic device comprising:

an image sharpener circuit comprising a high-pass frequency filter and configured to perform contrast enhancement on a luminance image comprising luminance information of a luminance pixel value of a pixel in an image to generate a delta version image of the luminance image, wherein the delta version image includes a high frequency component of the image;

a neural processor circuit configured to generate a content map identifying categories of content in segments of the image by performing a machine learning algorithm to the image;

a content image processing circuit coupled to the neural processor circuit and the image sharpener circuit, the content image processing circuit configured to receive the delta version image and the content map, and wherein the content image processing circuit further is configured to:

determine a content factor associated with the pixel of the image according to the identified categories of content in the image and at least one of a texture value of the pixel or a chroma value of the pixel, wherein the texture value indicates a likelihood of a category of content associated with the pixel based on a texture in the image, and wherein the chroma value indicates a likelihood of the category of content associated with the pixel based on color information of the image; and receive the content factor and generate a processed version image by at least applying the content factor to the delta version image; and an adder circuit coupled to the content image processing circuit and configured to:

receive the luminance image and the processed version image; and add the processed version image to low frequency components of the luminance information of the luminance image to generate a sharpened luminance image.

17. The electronic device of claim 16, wherein the processed version image comprises a noise reduced version of the luminance pixel value.

18. The electronic device of claim 16, wherein the delta version image includes a tone mapped version of the luminance pixel value.

19. The electronic device of claim 16, wherein the delta version image is generated by a bilateral filter applied to the luminance information of the luminance pixel value of the pixel.

20. The electronic device of claim 16, wherein the content image processing circuit is configured to apply the content factor to the delta version image by performing a first image processing operation responsive to the content factor being above a threshold and performing a second different image processing operation responsive to the content factor being below the threshold.

* * * * *